United States Patent
Albert

(10) Patent No.: US 6,686,836 B1
(45) Date of Patent: Feb. 3, 2004

(54) DEVICE FOR ACTUATING A VEHICLE ANTICRASH LIGHTS BASED ON A PREDETERMINED BRAKING THRESHOLD

(75) Inventor: Pascal Albert, Saint Mars du Desert (FR)

(73) Assignee: Suma Investment Holding, Luxembourg (LU)

( * ) Notice: Subject to any disclaimer, the term of this patent is extended or adjusted under 35 U.S.C. 154(b) by 0 days.

(21) Appl. No.: 10/018,882

(22) PCT Filed: Jun. 23, 2000

(86) PCT No.: PCT/FR00/01770

§ 371 (c)(1),
(2), (4) Date: Apr. 17, 2002

(87) PCT Pub. No.: WO01/00445

PCT Pub. Date: Jan. 4, 2001

(30) Foreign Application Priority Data

Jun. 25, 1999 (FR) .......................................... 99 08440

(51) Int. Cl.[7] ................................................. B60Q 1/44
(52) U.S. Cl. ....................................... 340/479; 340/467
(58) Field of Search ................................. 340/479, 467, 340/469, 463, 464, 468

(56) References Cited

U.S. PATENT DOCUMENTS

| 5,231,373 A | | 7/1993 | Freeman et al. | |
|---|---|---|---|---|
| 5,481,243 A | * | 1/1996 | Lurie et al. | 340/467 |
| 5,663,709 A | | 9/1997 | Juang | |
| 5,677,670 A | * | 10/1997 | Gangloff | 340/479 |
| 5,831,521 A | * | 11/1998 | Huang | 340/467 |
| 5,894,265 A | | 4/1999 | Hemingway | |
| 6,278,364 B1 | * | 8/2001 | Robert | 340/467 |

FOREIGN PATENT DOCUMENTS

| DE | 296 17 527 U1 | 2/1997 |
|---|---|---|
| EP | 0 505 337 A1 | 9/1992 |
| EP | 0 872 379 A2 | 10/1998 |

* cited by examiner

Primary Examiner—John Tweel
(74) Attorney, Agent, or Firm—Young & Thompson

(57) ABSTRACT

An emergency braking warning device includes a printed circuit (1) whereon are implanted a voltage regulator/stabiliser assembly (3), a two-way digital inertia sensor (5), a microprocessor (6) and power control elements (10, 11). The voltage regulator/stabiliser assembly (3) is connected to the vehicle battery and powers the two-way digital inertia sensor (5) and the microprocessor (6). The microprocessor (6) is adapted to manage data coming from the digital sensor (5) and it is connected to the power control elements (10, 11) interposed on the circuits of the right (8) and left (9) flashers, to enable the triggering of the flashers (8, 9) when the programmed braking threshold is exceeded.

10 Claims, 3 Drawing Sheets

DEVICE FOR ACTUATING A VEHICLE ANTICRASH LIGHTS BASED ON A PREDETERMINED BRAKING THRESHOLD

This invention relates to the general field of vehicle equipment. It concerns more particularly a new device for actuating vehicle anticrash lights based on a predetermined braking threshold, it also relates to an original method in order to actuate the anticrash lights using this device, as well as a material enabling to programme and to calibrate the said device.

Emergency braking warning devices using inertia sensors mounted on the vehicle are already known (automobile, motorbike or heavy vehicle) to trigger the anticrash lights automatically based on a predetermined braking threshold in order to warn the other drivers that the braking system of the vehicle has been initiated, with the potential inherent risk.

Generally, the known devices are not completely satisfactory, since their structure is complex or lacks accuracy and reliability.

In particular, the document DE-U-2 961 75 27 relates to an automobile equipment that implements automatically the anticrash lights of the vehicle when the 'ABS' or 'AIRBAG' system has been actuated, i.e. in case of emergency braking or collision.

This device can only operate in the presence of an 'ABS' or an 'AIRBAG' system and it cannot therefore be mounted on all types of vehicle.

Besides, the data from the safety equipment already available on the vehicle (ABS or AIRBAG) is used to trigger the anticrash lights. Triggering the anticrash lights is therefore only an accessory of the main safety equipment; this triggering can be hardly adjusted independently of the adjustments foreseen on the main pieces of safety equipment, and the operation of the triggering system of the anticrash lights can be altered by the presence of the main twin equipment.

This invention suggests a new material and a new method enabling to better meet the requirements set in that field, in particular in terms of endurance, reliability and accuracy.

The emergency braking warning system according to this invention consists of a printed circuit whereon are implanted, notably, a voltage regulator/stabiliser assembly, a two-way digital inertia sensor, a microprocessor and power control elements. The voltage regulator/stabiliser assembly is connected to the vehicle battery and powers the two-way digital inertia sensor and the microprocessor, which microprocessor is adapted to manage the data coming from the said sensor and is connected to the power controls (transistors or relays) interposed on the circuits of the right and left flashers to enable the simultaneous triggering of the said flashers when the programmed braking threshold is exceeded.

This device has the form of an electronic assembly housed in a casing that only calls for connection with the vehicle battery and with the circuits of the right and left flashers; it is a completely stand-alone device of simple, reliable design and straightforward to install on any type of vehicle.

This emergency braking warning device comprises preferably means that enable the triggering of a sound signal simultaneously to the triggering of the anticrash lights. Still advantageously, it comprises means that enable to detect the initiation of the vehicle windscreen wipers, whereas these means of detection are connected to the microprocessor in order, when the windscreen wipers are operating, to enable the said microprocessor to trigger the vehicle anticrash lights based on a reduced braking threshold.

The implementation method of this device is characterised in that it consists:
- in the microprocessor recording the successive digital values Vn delivered by the two-way digital inertia sensor mounted on the vehicle,
- in the microprocessor calculating the difference between each value Vn and the value Vn−x that was delivered by the inertia sensor a moment x previously,
- in the microprocessor performing a comparison between the value Vn−Vn−x and a predefined threshold value A, corresponding to a braking threshold value, and
- in the microprocessor triggering the simultaneous control of the right and left flashers, in the case when the difference Vn−Vn−x is greater than the threshold value A.

This method ensures permanent and automatic re-calibration of the material. It enables to use reduced accuracy when implanting the sensor in the vehicle, as regards its direction and its angle, it also enables to filter the data delivered by the sensor in order to trigger the anticrash lights only when appropriate.

According to another feature, the method according to this invention consists in performing full-scale calibration of the inertia sensor before installing the material on the vehicle. This calibration is carried out while recording the digital value of the sensor when its active line is in horizontal position, at zero speed, whereas this digital value corresponds to the value delivered by the affected sensor for a zero acceleration (0 g), and while recording the digital value of the sensor when its active line is in vertical position, at zero speed, whereas this digital value corresponds to the value delivered by the affected sensor for a 1 g acceleration, since these operations enable to obtain the full-scale digital value of the sensor between 0 g and 1 g, to deduce the digital value corresponding to the scale unit and to integrate this digital value in the programming of the microprocessor.

This invention also relates to a material suited to the programming and the calibration of the emergency braking warning device, before its installation in the vehicle.

According to the invention, this material comprises a seat for the reception and the locking in position of at least one printed circuit whereon is implanted the emergency braking warning device, whereas the said seat comprises a set of pins arranged to contact certain parts or elements of the printed circuit, in order to ensure the programming of the microprocessor by appropriate computerised means. This seat is hinged on a base in order to enable horizontal positioning of the active line of the sensor to record the digital value delivered for a zero acceleration (0 g) and to enable vertical positioning of the active line of the sensor to record the digital value delivered for a 1 g, in order to programme the microprocessor based on the calibration of the sensor.

The invention will be further illustrated, without any restrictions, using the following description of a particular embodiment, given only for exemplification purposes and represented on the appended drawings on which:

Figure 1:
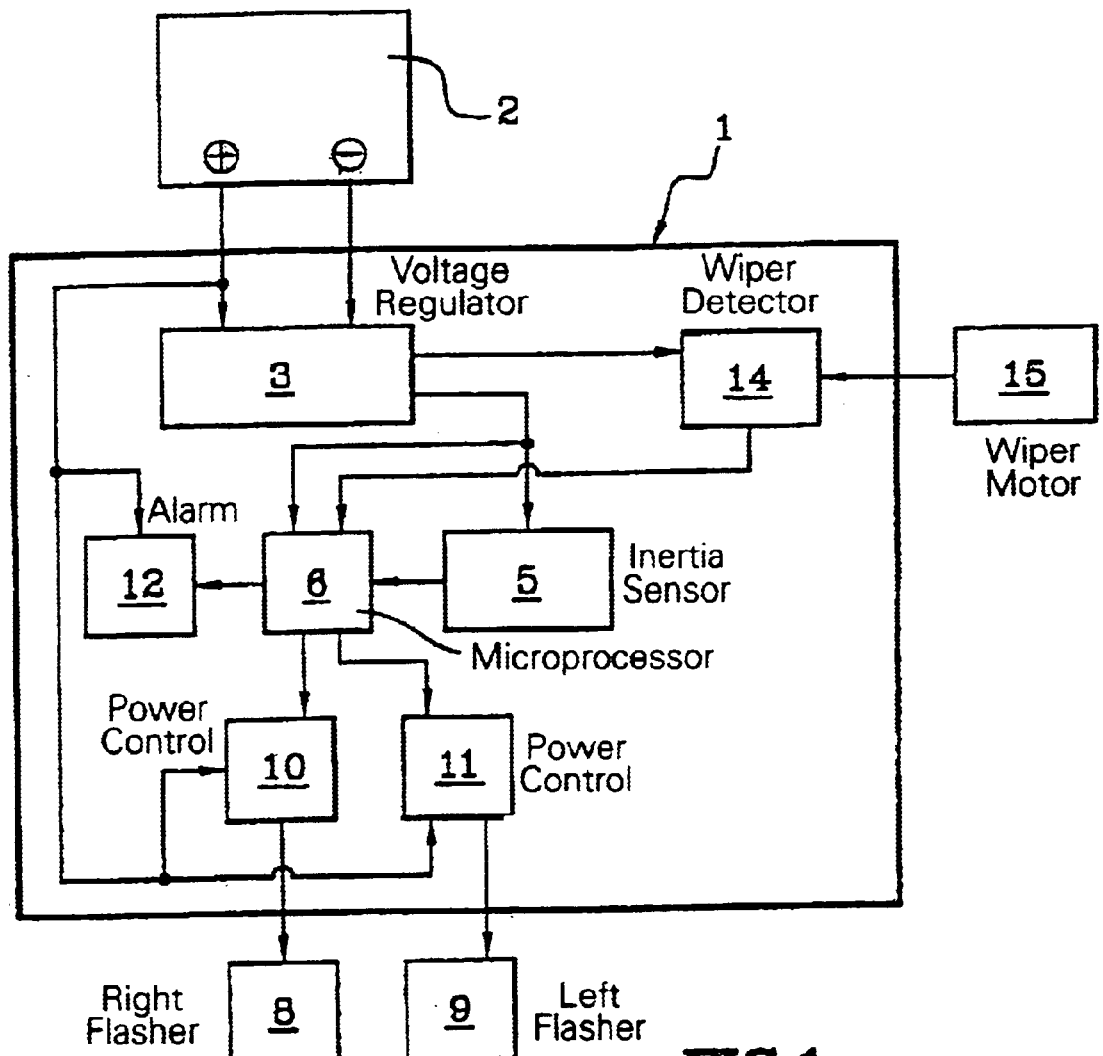
FIG. 1 is a block diagram of the functional elements of the emergency braking warning device according to the invention.

The emergency braking warning device illustrated on FIG. 1 has the form of a printed circuit 1 powered by the 12 volt battery 2 of the vehicle and comprising a voltage regulator/stabiliser assembly 3 that powers a two-way type digital inertia sensor 5 and a microprocessor 6.

The inertia sensor 5 can be a model of the type ADXL 202 by ANALOG DEVICE (PARIS, FRANCE). This kind of sensor is able to supply data on the acceleration or deceleration values that it receives on two perpendicular axes. For this application, only one of these axes is used, whereas this axis is called 'active line' throughout this description. The data supplied by the inertia sensor 5 consists of digital values, delivered every 56 milliseconds for the corresponding model. These digital values are generally different from one sensor to the other, for the same acceleration value; this precision tolerance will be solved for a calibration operation described below.

To maximise the operation of the emergency braking warning device, the printed circuit 1 should be mounted on the vehicle fitted so that the active line of the sensor 5 is arranged horizontally or substantially horizontally (whereas the vehicle rests itself on a horizontal ground), oriented on the forward axis of the vehicle.

The microprocessor 6 used can be a model 2343 with EDPROM by ATMEL (PARIS, FRANCE).

This microprocessor 6 is programmed to handle the data delivered by the inertia sensor 5 in order to ensure the simultaneous triggering of the right 8 and left 9 flashers (i.e. the triggering of the anticrash lights) by means of power controls, respectively 10 and 11, when a predetermined braking threshold has been exceeded. The handling process of the data delivered by the sensor 5 to reach a reliable and accurate result will be explained below.

The power controls 10 and 11 consist of relays or transistors powered by the 12 volt battery 2.

The printed circuit 1 comprises a sound alarm 12 driven by the microprocessor 6.

It also comprises electronic means 14, connected to the windscreen wiper motor 15 of the vehicle (as regards an implantation of the warning device on an automotive vehicle or a heavy vehicle), which enables to detect the operation of the windscreen wipers (i.e. the presence of rain in an indirect fashion) and to send the corresponding data to the microprocessor 6.

The microprocessor 6, programmed consequently, has therefore the possibility of triggering the anticrash lights of the vehicle based on a reduced braking threshold, in case of rain.

Beside the inertia sensor 5 and the microprocessor 6, the different functional parts of the printed circuit described above (the voltage regulator/stabiliser assembly 3, power controls 10, 11, sound alarm 12 and detection assembly 14) consist of an association of conventional electronic components (resistors, diodes, capacitors, . . . ), implanted in a logical fashion by the designer in order to obtain the functions described.

Figure 2:
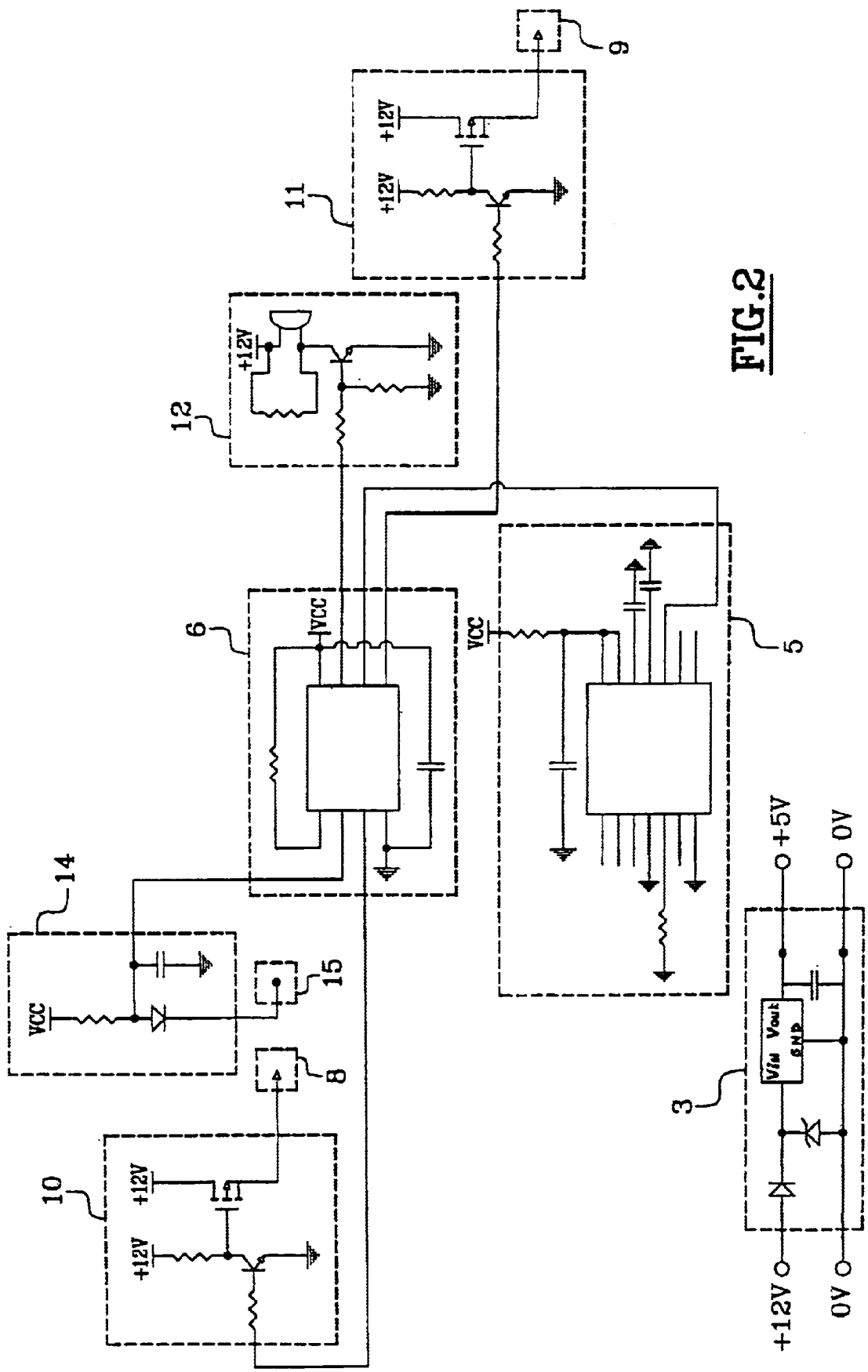
FIG. 2 is a detailed electronic diagram of an embodiment of the emergency braking warning device.

An example of design detailed in this emergency braking warning device is illustrated on FIG. 2; on this figure, the functional parts that have just been described, are individualised and itemised identically.

The printed circuit 1 comprises electrical connection outputs that enable the connection of the voltage regulator/stabiliser 3 with the +12 volt pin of the battery 2 and the earth of the means of detection 14 with the +12 volt power supply of the windscreen wiper motor 15, and of the power controls 10 and 11 respectively with the right 8 and left 9 flashers.

For implantation in the vehicle, the printed circuit is advantageously protected by a cowling in the form of a casing.

Once the printed circuit has been made, the microprocessor 6 is programmed to enable handling of the data delivered by the two-way digital inertia sensor 5 and, during the said programming, the inertia sensor 5 is calibrated to solve the tolerance problems as regards the accuracy of the digital values that it delivers and to obtain a great triggering accuracy.

Figure 3:
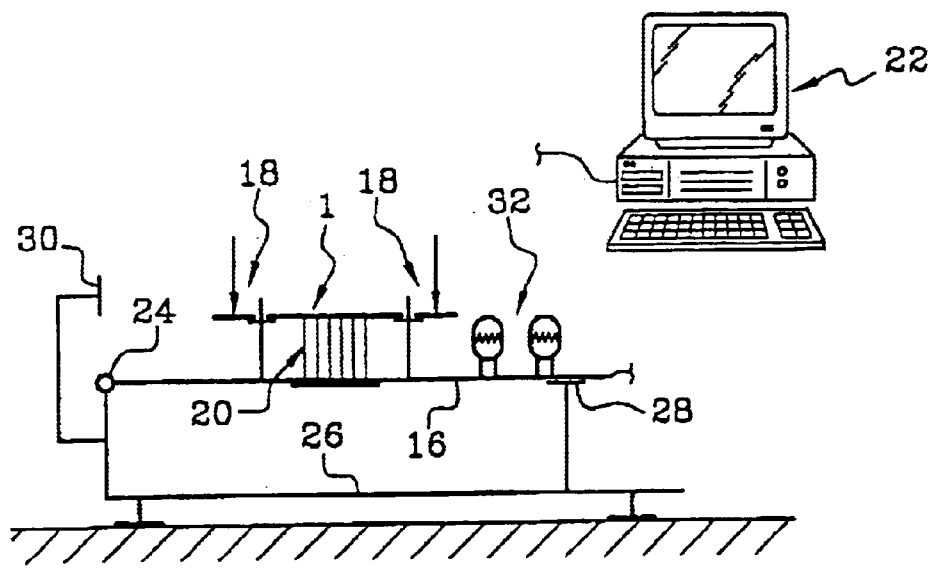
FIGS. 3 and 4 are functional diagrams of the materials enabling to programme and to calibrate the emergency braking warning device according to the invention, illustrating the two positions that it may occupy to record the digital values of the sensor at 0 g and 1 g.
Figure 4:
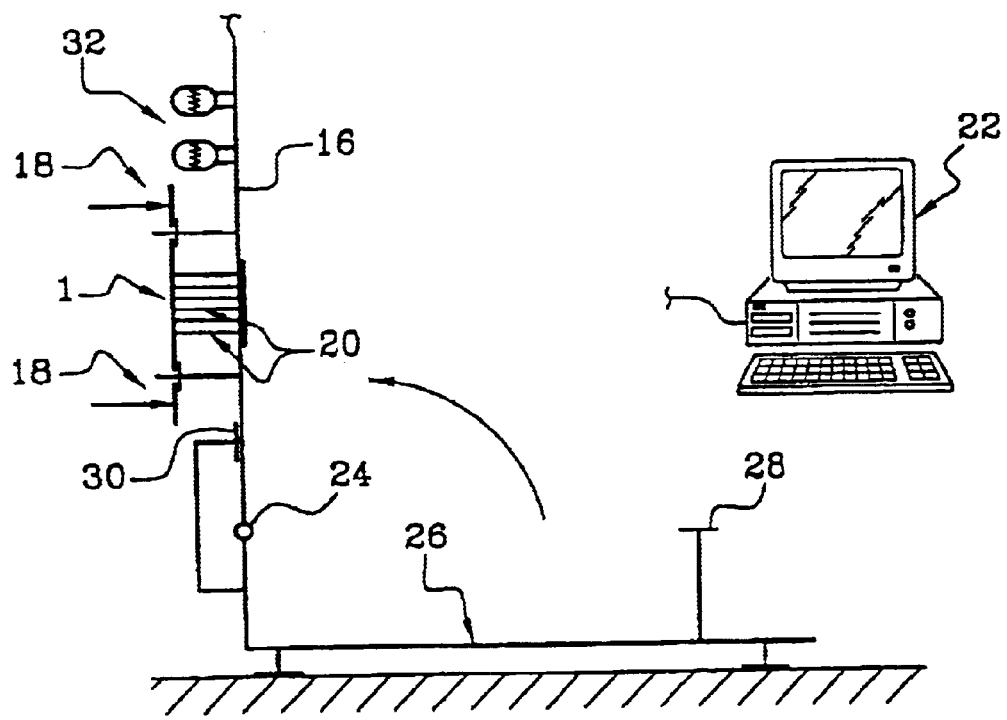

These programming/calibration operations are performed by means of a specific material illustrated in a functional manner on FIGS. 3 and 4.

This particular material comprises a seat 16 fitted with means 18 that enable positioning of the printed circuit 1 on programming and test pins 20, connected to computerised means 22.

The programming and test pins 20, of the spring-loaded contact type, are arranged in relation to the implantation of the electronic elements on the printed circuit and in particular in relation to the implantation of the microprocessor 6.

The seat 16 is moreover hinged at 24 on a main base 26 in order to enable it to pivot by 90°, between two positioning stops 28 and 30. This 90°-pivoting is adapted, in relation to the implantation of the sensor 5 on the printed circuit, to enable to place the active line of this sensor, either horizontally (FIG. 2) or vertically (FIG. 3).

Figure 5:
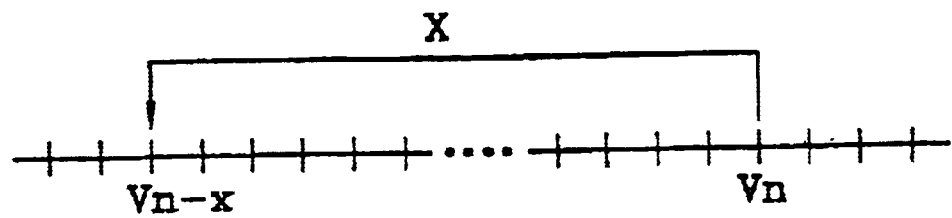
FIG. 5 illustrates the analysis principle used by the microprocessor for the digital values delivered by the inertia sensor.

The microprocessor 6 is programmed in order to record the successive values Vn delivered by the inertia sensor 5. Simultaneously, the microprocessor calculates the difference between each value Vn and the value Vn−x that was delivered by a sensor a moment x previously (see FIG. 5), whereas this predetermined moment x may be in the order of some tenths of seconds or several seconds.

This difference Vn−Vn−x is compared to a threshold value A, defined in advance, corresponding to a braking threshold value, and the simultaneous triggering of the right and left 8 and 9 flashers is controlled, when the difference Vn−Vn−x is greater than this threshold value A (for an automobile, this threshold value A may correspond to a deceleration in the order of 0.5 to 1 g).

The anticrash lights are held actuated for a predetermined time once they have been triggered, for example in the order of several seconds. The light-indicators of the dashboard that show the triggering of the flashers are also actuated; to complete the information given to the driver, the sound alarm 12 is triggered simultaneously and preferably during the same period.

As seen previously, the microprocessor 6 is also programmed to trigger the anticrash lights based on a reduced braking threshold, in case of rain. To do so, the means of detection 14 inform the microprocessor of the operation of the vehicle windscreen wipers; and automatically, the microprocessor then takes is into account a smaller value A' (for example in the order of 5% smaller).

This modus operandi enables automatic and permanent re-calibration of the emergency braking warning device so that, notably, there is no need to position the sensor 5 perfectly horizontally on the vehicle, and so as not to take into account the slopes or unevenness of the road, for triggering the anticrash lights.

As stated previously, programming the emergency braking warning device using the computerised means 22 also incorporates a calibration operation of the sensor 5, while using the 90°-pivoting capacities of the seat 16.

While positioning the active line of the sensor 5 (FIG. 2) horizontally, it is possible to record the digital value delivered by this sensor at 0 g (zero acceleration); its vertical positioning (FIG. 3) enables to record the digital value that it delivers for a 1 g acceleration. Both these records enable to obtain the full scale digital value of the sensor considered, between 0 g and 1 g, and also to deduce the digital value corresponding to the unit of the scale.

This scale unit value is incorporated in the programming of the microprocessor in order to ensure reliable and accurate triggering of the anticrash lights, always for a same accurate deceleration value, even in spite of differences from one sensor to another as regards the precision of the digital values delivered.

Once the device has been programmed and calibrated, it can be tested after rapid tilting from the horizontal position to the vertical position. Light-indicators 32 implanted on the seat 16 then simulate when the flashers are on.

This programming/calibration material can be suited to receive several printed circuits 1.

What is claimed is:

1. An emergency braking warning device enabling the actuation of anticrash lights of a vehicle based on a predetermined braking threshold, characterised in that it consists of a printed circuit whereon are implanted, notably, a voltage regulator/stabiliser assembly (3), a two-way digital inertia sensor (5), a microprocessor (6) and power control elements (10, 11), which voltage regulator/stabiliser assembly (3) connected to the vehicle battery powers the two-way digital inertia sensor (5) and the microprocessor (6), which microprocessor (6) is adapted to manage the data coming from the said digital sensor (5) and is connected to the power controls (10, 11) interposed on the circuits of the right (8) and left (9) flashers to enable the simultaneous triggering of the said flashers (8, 9) when the programmed braking threshold is exceeded.

2. A device according to claim 1, characterised in that it comprises, arranged on the printed circuit (1), means (12) enabling the triggering of a sound signal simultaneously to the triggering of the anticrash lights.

3. A device according to claim 1, characterized in that it comprises means (14) that enable to detect the initiation of the vehicle windscreen wipers, which means are connected to the microprocessor (6) in order, when the windscreen wipers are operating, to enable the said microprocessor to trigger the vehicle anticrash lights based on a reduced braking threshold.

4. A method to implement the anticrash lights of a vehicle based on a predetermined braking threshold, by means of a device according to claim 1, characterized in that it consists:

in the microprocessor (6) recording the successive digital values Vn delivered by the two-way digital inertia sensor (5), in the microprocessor (6) calculating the difference between each value Vn and the value Vn–x that was delivered by the inertia sensor (5) a moment x previously, in the microprocessor (6) performing a comparison between the value Vn–Vn–x and a predefined threshold value A, corresponding to braking threshold value, and in the microprocessor (6) triggering the simultaneous control of the right and left (8, 9) flashers, when the difference Vn–Vn–x is greater than the said threshold value A.

5. A method according to claim 4, characterised in that it consists in performing calibration of the inertia sensor (5) before installing the material on the vehicle, which calibration is carried out while recording the digital value of the sensor (5) when its active line is in horizontal position, at zero speed, corresponding to a zero acceleration (0 g), and while recording the digital value of this sensor (5) when its active line is in vertical position, at zero speed, corresponding to a 1 g acceleration, since both these records enable to obtain the full-scale digital value of the sensor (5) between 0 g and 1 g, to deduce the digital value corresponding to the scale unit and to integrate this digital value in the programming of the microprocessor.

6. A method according to claim 4, characterised in that it consists, as soon as the microprocessor (6) detects that the threshold value A has been exceeded, in triggering the anticrash lights of the vehicle for a determined period in the order of several seconds.

7. A method according to claim 4, characterized in that it consists in triggering a sound signal simultaneously to the triggering of the anticrash lights.

8. A method according to claim 4, characterised in that it consists in reducing the threshold value A in case of rain, in order, in such a case, to implement the anticrash lights based on a smaller braking threshold.

9. A method according to claim 8, characterised in that it consists in taking into account the detection of the windscreen wiper control of the vehicle to lower automatically the threshold value A.

10. A material especially designed for programming and calibrating the emergency braking warning device according to claim 1, before installation in the vehicle, characterized in that it comprises a seat (16) for the reception and the locking in position of at least one printed circuit (1) whereon is implanted the emergency braking warning device, whereas the said seat (16) comprises a set of pins (20) arranged to contact certain parts or elements of the printed circuit, in order to ensure the programming of the microprocessor (6) by appropriate computerized means (22) and the said seat (16) is hinged on a base (26) in order to enable horizontal positioning of the active line of the sensor (5) and to enable vertical positioning of this active line, in order to programme the microprocessor (6) based on the calibration of the sensor (5).

* * * * *